(12) United States Patent
Young

(10) Patent No.: US 8,689,854 B2
(45) Date of Patent: Apr. 8, 2014

(54) DECOMPOSITION CONDUIT FABRICATION METHOD

(75) Inventor: David S. Young, Asbury, IA (US)

(73) Assignee: Deere & Company, Moline, IL (US)

( * ) Notice: Subject to any disclaimer, the term of this patent is extended or adjusted under 35 U.S.C. 154(b) by 367 days.

(21) Appl. No.: 13/031,824

(22) Filed: Feb. 22, 2011

(65) Prior Publication Data

US 2012/0211116 A1  Aug. 23, 2012

(51) Int. Cl.
B22C 9/10 (2006.01)
B22D 25/02 (2006.01)
B22D 29/00 (2006.01)

(52) U.S. Cl.
USPC ............... 164/15; 164/47; 164/131; 164/369

(58) Field of Classification Search
USPC ..................................... 164/15, 47, 131, 369
See application file for complete search history.

(56) References Cited

U.S. PATENT DOCUMENTS 3,729,937 A * 5/1973 Haddad .......................... 60/298
5,857,328 A    1/1999 Blanchet
2008/0256931 A1  10/2008 Kawakita

FOREIGN PATENT DOCUMENTS

DE  102007020812 A1  11/2008
DE  102007051510 A1  4/2009
FR      2912464 A1  8/2008
WO  WO2010/045285 A2  4/2010

OTHER PUBLICATIONS

EPO Search Report, P20271 EP CM/VG, App. No. 12154712.9-1606/2492466, Oct. 18, 2013.

* cited by examiner

Primary Examiner — Kevin P Kerns
(74) Attorney, Agent, or Firm — Taft Stettinius & Hollister LLP; Stephen F. Rost, Esq.

(57) ABSTRACT

A method of fabricating a decomposition conduit with an in-line static mixer, the method including molding a decomposition conduit housing around a sand core by inserting molding material into a cavity between a decomposition conduit housing mold and the sand core, where the sand core includes a static mixer and, where the act of molding the decomposition conduit housing is operative to mount the static mixer to the molded decomposition conduit housing.

13 Claims, 16 Drawing Sheets

DECOMPOSITION CONDUIT FABRICATION METHOD

FIELD OF THE INVENTION

The present disclosure relates to diesel exhaust emissions technology and, more specifically, to a decomposition conduit fabricated with an integrated mixer and methods of manufacturing the same.

BACKGROUND OF THE INVENTION

Referring to FIG. 1, an exemplary schematic diagram illustrates an inline six cylinder diesel engine 10 with exhaust gas recirculation (EGR) that is utilized to reduce $NO_x$ formation. EGR works by recirculating a portion of an engine's exhaust gas back to the engine cylinders. In a diesel engine, the exhaust gas replaces some of the excess oxygen in the pre-combustion mixture. Because $NO_x$ forms primarily when a mixture of nitrogen and oxygen is subjected to high temperature and $NO_x$ formation progresses much faster at high temperatures, EGR reduces the amount of $NO_x$ the combustion generates. Nevertheless, $NO_x$ formation is an inherent part of combustion.

$NO_x$ formation has been known to have significant detrimental consequences on our environment. These consequences include acid rain, smog, and creation of harmful particulate matter. In order to combat these consequences, diesel engine manufacturers have implemented technologies to reduce $NO_x$ from diesel fuel combustion. One of these technologies involves downstream treatment of the diesel exhaust through selective catalytic reduction (SCR).

SCR uses a urea based diesel exhaust fluid (DEF) and a catalytic converter to significantly reduce oxides of nitrogen ($NO_x$) emissions. Small quantities of diesel exhaust fluid (DEF) are injected into the exhaust upstream of a catalyst, where it vaporizes and decomposes to form ammonia and carbon dioxide. Ammonia ($NH_3$) is the desired product, which in conjunction with the SCR catalyst, converts the $NO_x$ to harmless nitrogen ($N_2$) and water ($H_2O$).

FIG. 1 shows a common SCR implementation. In this circumstance, exhaust from the diesel engine 10 is directed through a particulate filter 12 and into a decomposition tube 14. In the decomposition tube 14, DEF (a blended aqueous urea solution and deionized water) from a supply tank 16 is injected into communication with the exhaust, which results in the urea decomposing to form ammonia prior to introduction to a catalytic converter 18. Within the catalytic converter 18, the ammonia and $NO_x$ components of the exhaust react in the presence of the catalyst to generate water, nitrogen gas, and oxygen gas. The water, nitrogen gas, and oxygen gas is thereafter conveyed to the open atmosphere via an exhaust stack or tailpipe 20.

As part of a common SCR implementation, decomposition tubes are formed by rolling metal sheets to form a circular cross-section tube. Thereafter, the tube is modified to include an injector fitting, commonly by welding the injector fitting over a preexisting opening in the rolled tube. Likewise, to the extent a mixer is provided with the decomposition tube, an entirely separate mixing structure is positioned within the tube and welded to the interior of the tube. The additional steps of mounting the injector fitting and mixing structure within the rolled tube add considerable cost and time to the overall fabrication process for producing a decomposition tube. At the same time, the welds may sometimes impart localized areas of weakness to the rolled tube that may eventually give way and create unintended orifices within the tube. Moreover, the seams between the welds and the decomposition tube and mixer are subject to attack by urea that flows through the decomposition tube, causing separation between the welds and the decomposition tube and mixer. This separation leads to attachment failure between the mixer and the decomposition tube.

SUMMARY

The exemplary embodiments of the present disclosure include novel decomposition conduits and methods of fabricating these novel conduits.

It is a first aspect of the present disclosure to provide a method of fabricating a decomposition conduit with an in-line static mixer, the method comprising molding a decomposition conduit housing around a sand core by inserting molding material into a cavity between a decomposition conduit housing mold and the sand core, where the sand core includes a static mixer and, where the act of molding the decomposition conduit housing is operative to mount the static mixer to the molded decomposition conduit housing.

In a more detailed embodiment of the first aspect, the sand core comprises a cylindrical sand body interposed by the static mixer, the cylindrical sand body including a projection representative of an injector adapter of the decomposition conduit housing. In yet another more detailed embodiment, the act of molding the decomposition conduit includes suspending the sand core at least partially within the decomposition conduit housing mold. In a further detailed embodiment, the static mixer includes a plurality of mixer fins distributed within a metal band having an outer circumferential face and, the act of molding the decomposition conduit housing includes overmolding material into contact with the outer circumferential face of the static mixer, where overmolding the material operates to bond the static mixer to the decomposition conduit housing. In still a further detailed embodiment, the method also includes the act of removing the molded decomposition housing from the mold, where at least a portion of the sand core remains within the molded decomposition housing when the decomposition housing is removed from the mold.

It is a second aspect of the present disclosure to provide a method of fabricating a decomposition conduit with an in-line static mixer, the method comprising: (a) creating a sand core incorporating a static mixer; (b) inserting the sand core into a mold to create a decomposition conduit cavity; and, (c) molding a decomposition conduit housing around the sand core by inserting molding material into the decomposition conduit cavity, where the act of molding the decomposition conduit housing is operative to mount the static mixer to the molded decomposition conduit housing.

In a more detailed embodiment of the second aspect, the act of creating the sand core includes forming a cylindrical sand body interposed by the static mixer, the cylindrical sand body including a projection representative of an injector adapter of the decomposition conduit housing. In yet another more detailed embodiment, the act of creating the sand core includes positioning the static mixer within a sand core mold, wherein the static mixer and the sand core mold cooperate to delineate a sand core cavity. In a further detailed embodiment, the sand core mold includes prongs formed by walls of the sand core mold tapering to seat the static mixer therein. In still a further detailed embodiment, the static mixer includes a plurality of mixer fins distributed within a metal band having an outer circumferential face and, the act of molding the decomposition conduit housing includes overmolding material into contact with the outer circumferential face of the static mixer, where overmolding the material operates to bond the static mixer to the decomposition conduit housing. In a more detailed embodiment, the sand core includes a bell and, the act of molding the decomposition conduit housing includes integrally forming the bell. In a more detailed embodiment, the sand core includes a plurality of bells and, the act of molding the decomposition conduit includes integrally forming the plurality of bells. In another more detailed embodiment, the sand core includes a pair of circumferential depressions formed on opposite sides of the static mixer.

It is a third aspect of the present disclosure to provide a decomposition structure comprising a decomposition conduit including an outer housing defining a flow path between an inlet orifice and an outlet orifice, the decomposition conduit including an integral static mixer in series with the fluid flow path.

In a more detailed embodiment of the third aspect, the decomposition conduit includes at least one of a ninety degree elbow section and a straight section. In yet another more detailed embodiment, the decomposition conduit further includes an integrated injector port. In a further detailed embodiment, the decomposition conduit and the injector port comprise cast metal. In still a further detailed embodiment, the static mixer is embedded within the housing of the decomposition conduit. In a more detailed embodiment, the decomposition conduit is at least partially filled with sand.

DETAILED DESCRIPTION

The exemplary embodiments of the present disclosure are described and illustrated below to encompass decomposition tubes and methods of fabricating decomposition tubes. Of course, it will be apparent to those of ordinary skill in the art that the exemplary embodiments discussed below are merely examples and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present invention.

Figure 1:
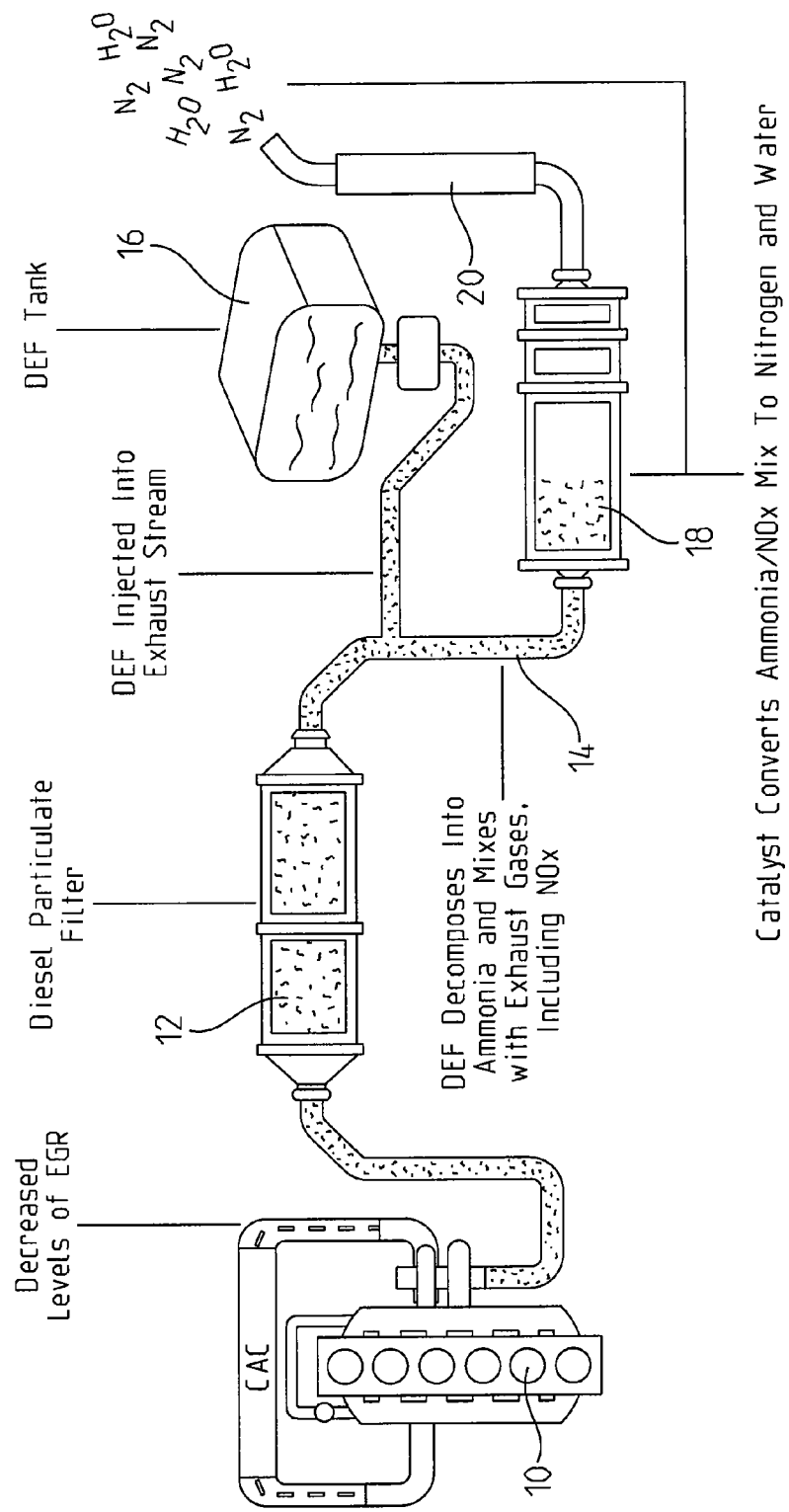
FIG. 1 is a schematic diagram showing techniques to reduce particulate and nitrogen oxide emissions from combustion engines.
Figure 2:
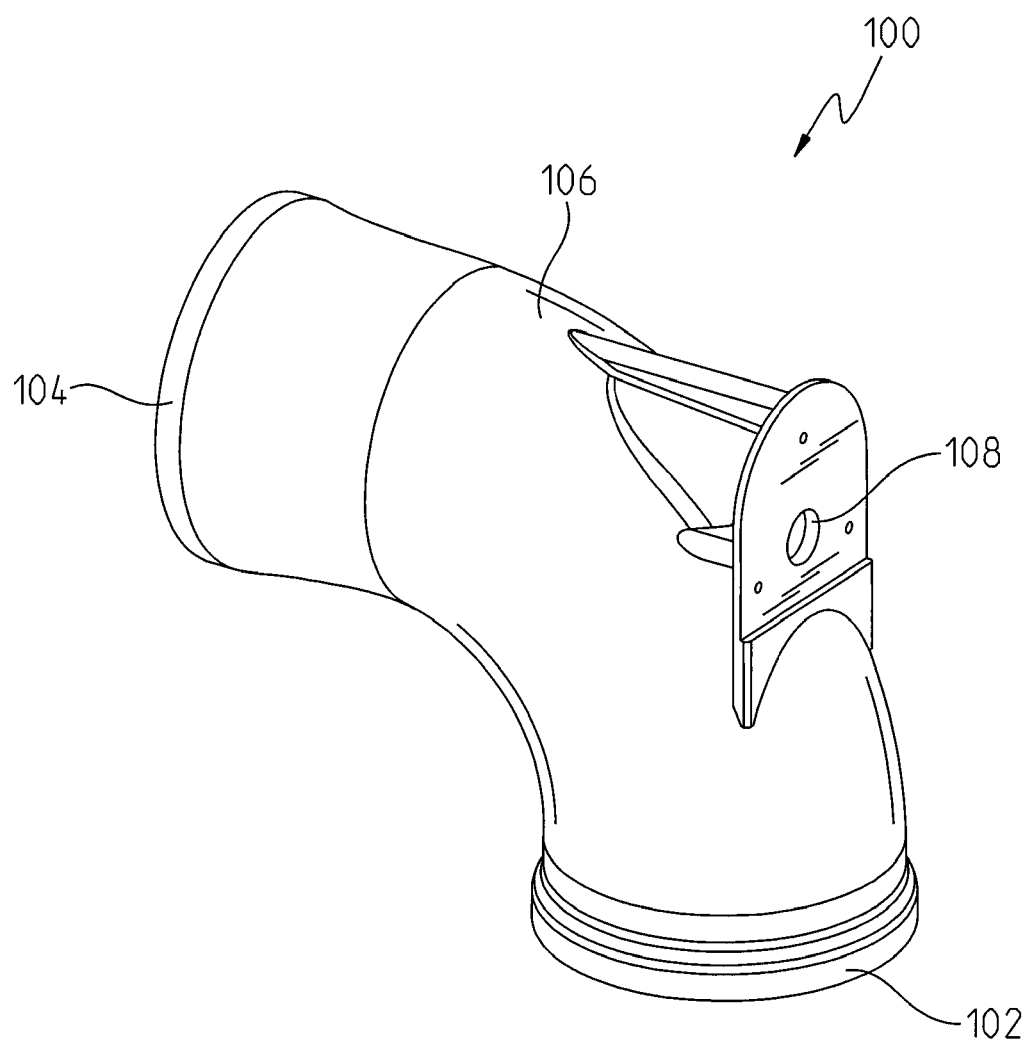
FIG. 2 is an elevated perspective view from the rear of a first exemplary decomposition conduit fabricated in accordance with the instant disclosure.
Figure 3:
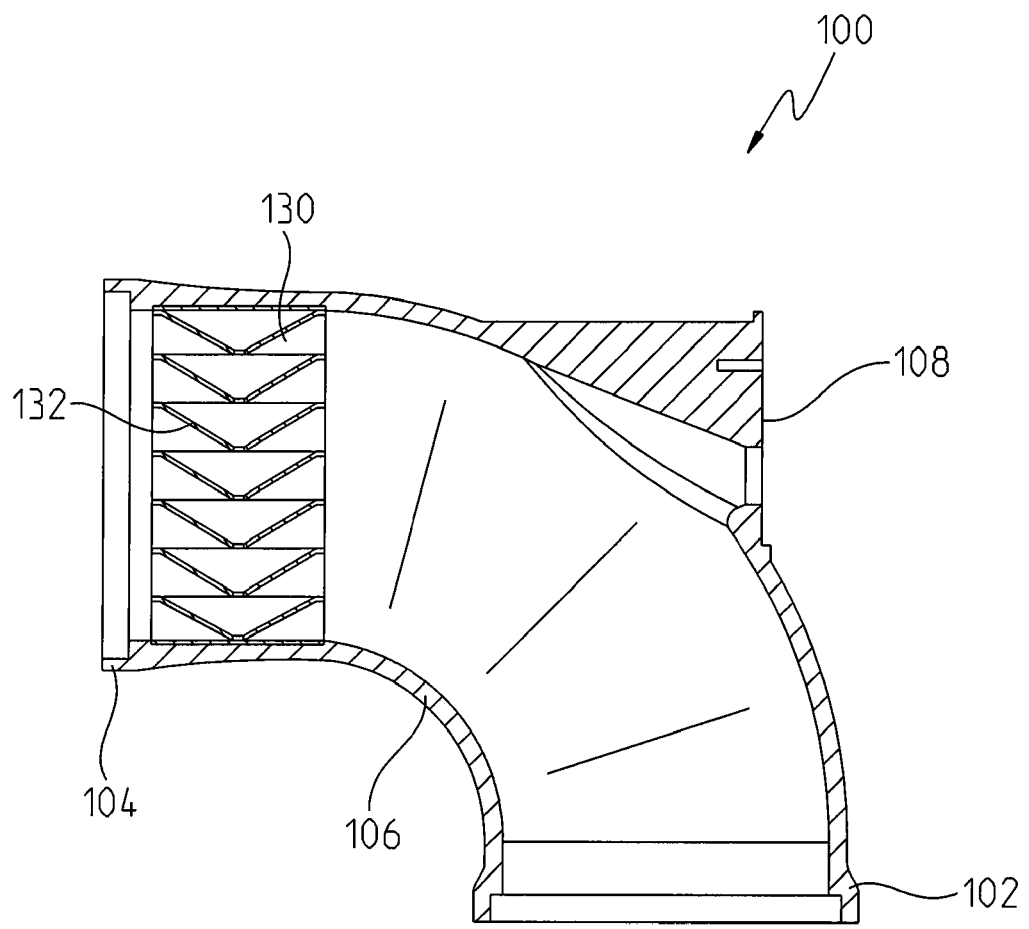
FIG. 3 is a vertical cross-sectional view of the exemplary decomposition conduit of FIG. 2.
Figure 4:
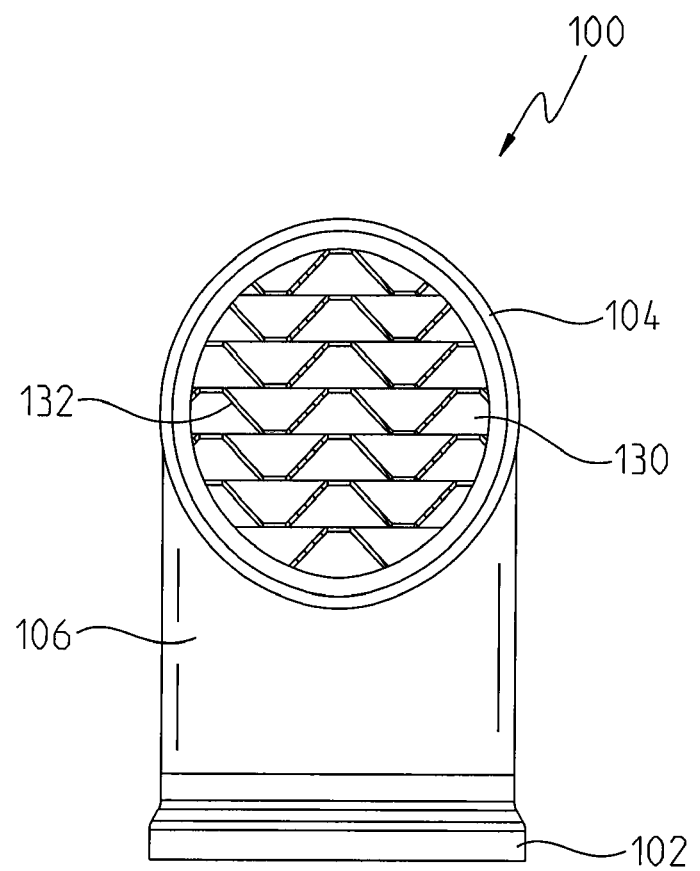
FIG. 4 is a frontal view of the exemplary decomposition conduit of FIG. 2.

Referencing FIGS. 2-4, a first exemplary decomposition conduit 100 includes an inlet bell 102 in communication with an outlet bell 104 via a ninety degree curved elbow or conduit 106. The bells 102, 104 are integrally formed with the curved conduit 106 and provide a female interface to accept corresponding male pipes (not shown). Fluid flow is adapted to pass through the inlet bell 102 in a Y-direction and be redirected in an X-direction (see FIG. 8), approximately perpendicular to the Y-direction, before egressing through the outlet bell 104.

Figure 5:
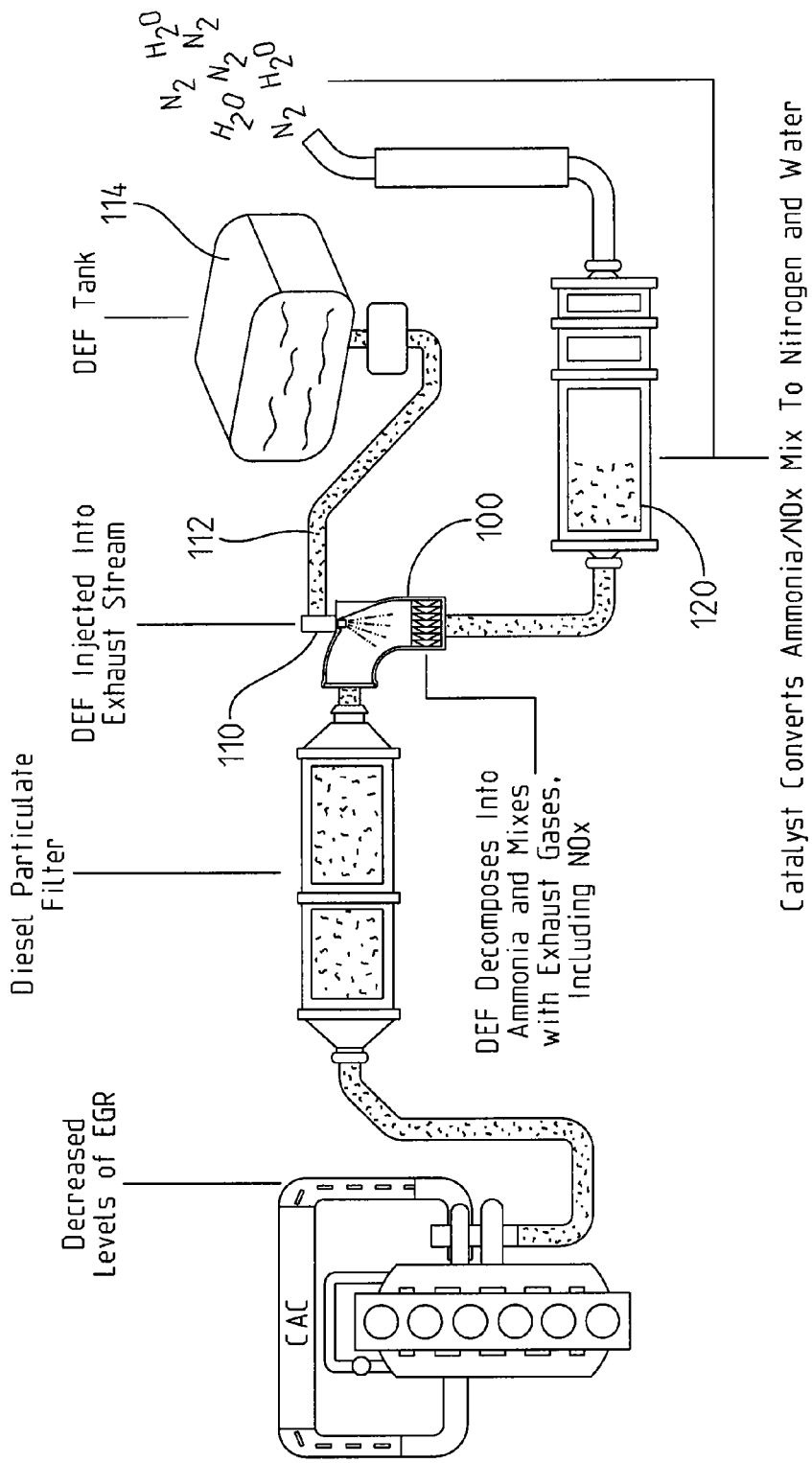
FIG. 5 is an exemplary schematic diagram showing techniques to reduce particulate and nitrogen oxide emissions from combustion engines that utilize an exemplary decomposition conduit of the instant disclosure.

An injector fitting 108 is integrally formed with the conduit 106 in order to receive an injector 110 (see FIG. 5). Any commercially available DEF injectors may be used with the instant decomposition tube 100. In this exemplary embodiment, the injector is received within the injector fitting 108 and mounted thereto in order to direct the DEF fluid coaxially with the exhaust flowing in the X-direction.

Referring to FIG. 5, by way of example, the injector 110 is connected to a DEF supply line 112 in communication with a DEF supply tank 114. In this manner, the DEF tank supplies DEF fluid to the injector 110, where DEF fluid is injected into communication with the exhaust. As discussed previously, DEF fluid decomposes to form ammonia that is mixed with exhaust prior to reaching a catalytic converter 120 downstream from the decomposition conduit 100. But additional mixing other than inherently provided by DEF fluid and exhaust being in communication with one another is preferred.

Referring back to FIGS. 2-4, an in-line static mixer 130 is provided as part of the decomposition conduit 100 downstream from the injector fitting 108 and just upstream from the outlet bell 104. The static mixer 130 comprises a series of fixed elements or fins 132 circumscribed by a metal band integrally formed and mounted to the interior wall of the conduit. The fixed geometric design of the elements 132 simultaneously produces patterns of flow division and radial mixing. As a result, the ammonia and exhaust are mixed more effectively. One of the advantages of a static mixer 130 over a conventional mixer is the absence of moving parts that may be prone to motion stresses and corresponding fatigue failure. Unlike prior art decomposition tubes, the static mixer 130 is formed as an integral unit with the curved conduit 106 and the injector fitting 108.

Figure 6:
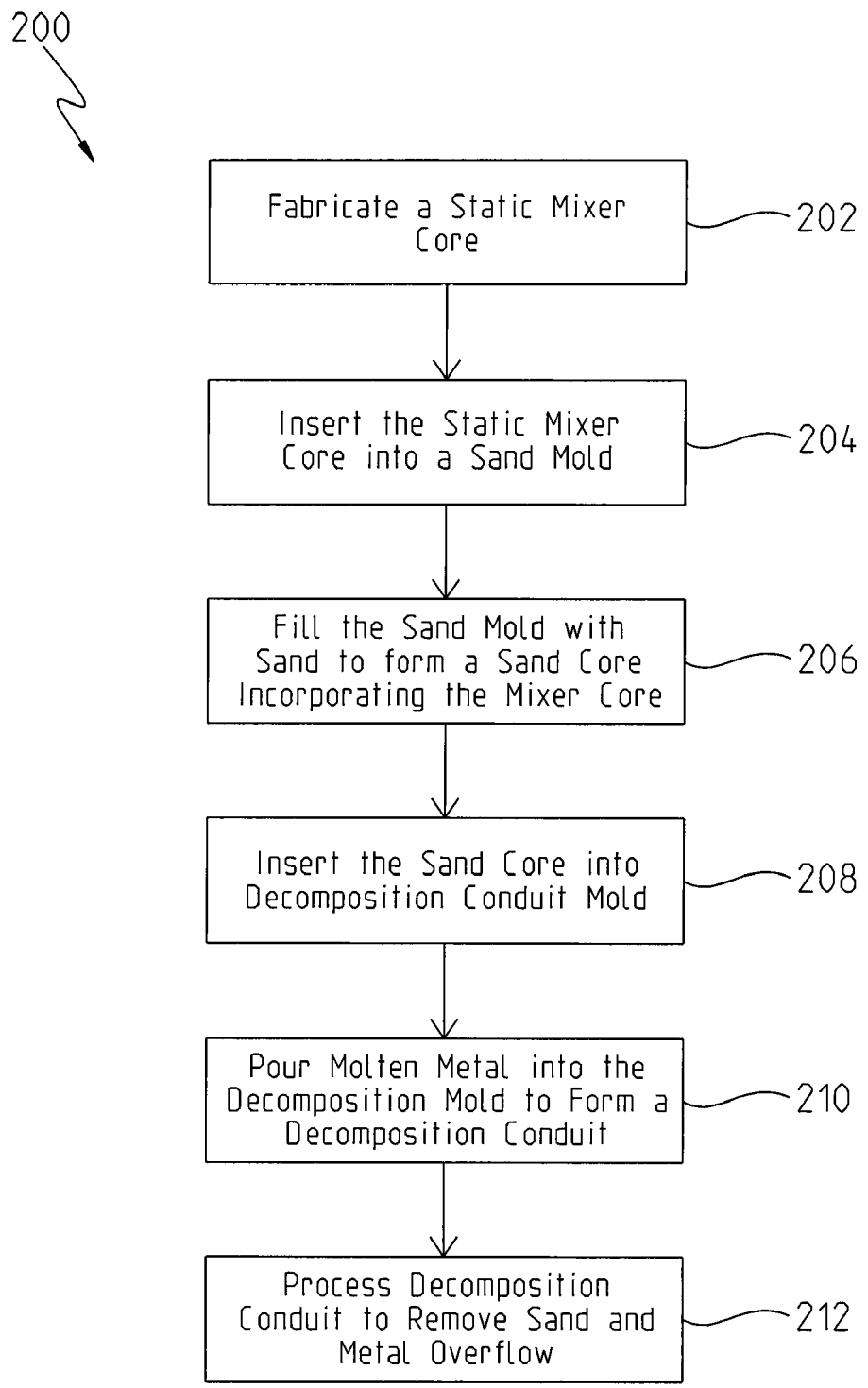
FIG. 6 is an exemplary process flow diagram for constructing a decomposition conduit consistent with the instant disclosure.

Referring to FIG. 6, an exemplary process flow 200 details how the decomposition conduit 100 is fabricated. As an initial step 202, the static mixer core 130 is fabricated. Those skilled in the art are familiar with fabricating static mixer cores 130 bounded by a circular wall. After the static mixer core 130 is fabricated, the second step 204 is to insert the static mixer core 130 into a sand mold (see FIG. 7) in order to form a sand core 230 (see FIG. 8).

Figure 7:
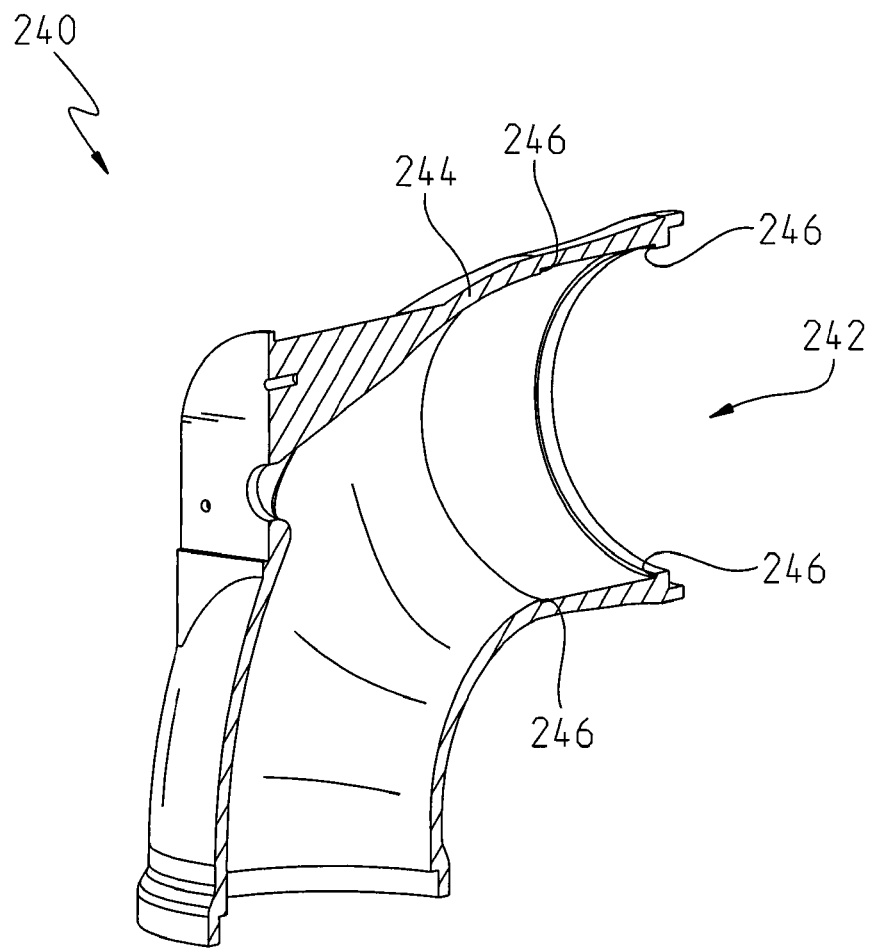
FIG. 7 is an elevated perspective view of one half of a sand mold in accordance with the instant disclosure.
Figure 8:
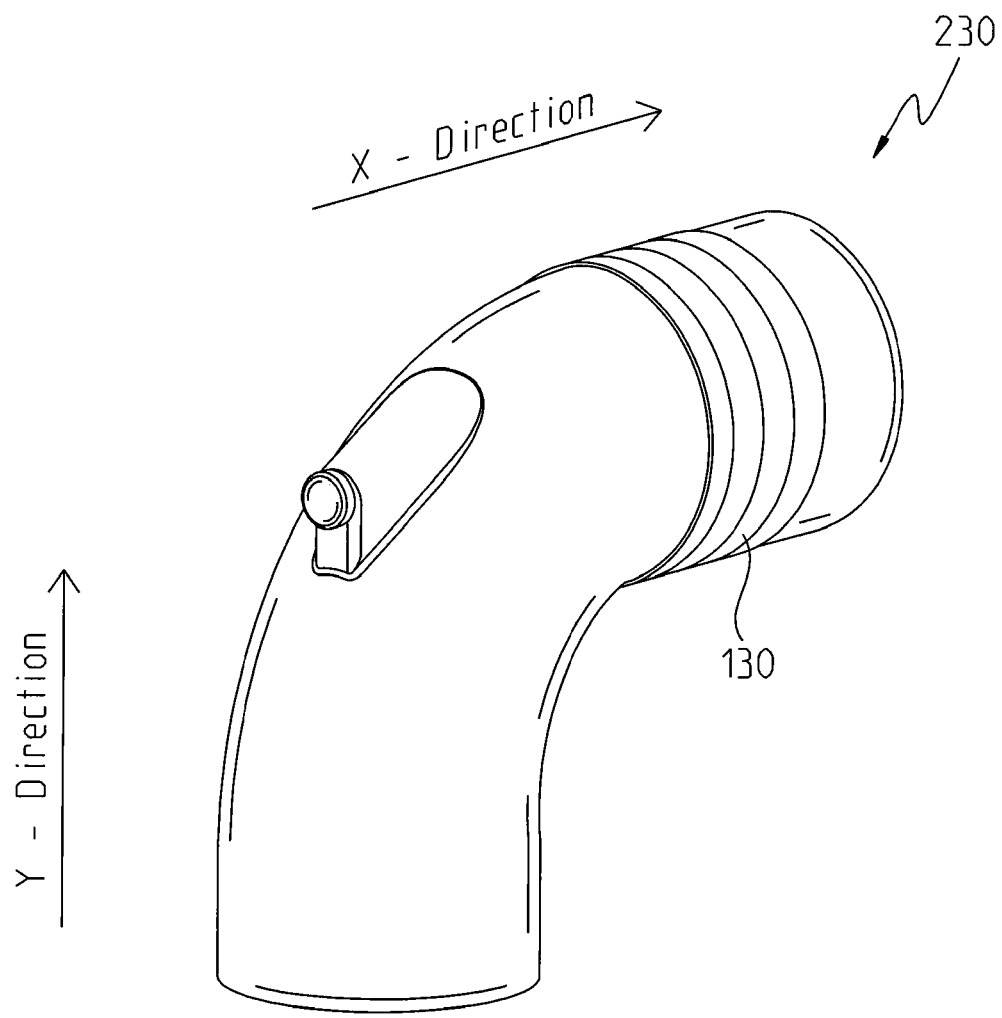
FIG. 8 is an elevated perspective view from the rear of an exemplary sand core utilized to fabricate the exemplary decomposition conduit of FIG. 2.

Referring to FIGS. 7 and 8, a variety of techniques are employed to carry out the third step 206 of fabricating the sand core 230, depending on the nature of the mixture, the desired strength of the mold and the type of metal to be cast. In this exemplary embodiment, the sand mold comprises two half sections 240 each having an interior cavity 242 that is exactly one half of the size and includes the same dimensions as the interior of the decomposition conduit 100 to be fabricated. Each sand mold half 240 includes an elbow-shaped wall 244 that tapers to include a pair of circumferential projections 246. These circumferential projections 246 operate as boundaries or bookends to help seat the static mixer 130 within the mold. It should be noted that the taper of the wall 244 is operative to, reduce the cross-section of the sand core 230. As will be discussed hereafter, this reduction in the cross-section of the sand core 230 cooperates with the decomposition mold to create a decomposition conduit with a smooth transition between its interior wall and that of the static mixer 130. After the static mixer core 130 is positioned on the inside of the mold halves 240, the mold halves are brought together and closed, followed by the introduction of sand to fill all of the voids on the interior of the mold that are not otherwise occupied by the static mixer core. The mold halves 240 are generally constructed of metal, but the mold halves may also be constructed of wood, gypsum or other material having sufficient hardness and strength.

One exemplary technique to fill the interior of the mold involves blowing a sand-air mixture into the mold to uniformly distribute the sand (with resin) within the mold. Afterwards, the sand is packed within the mold using a combination of vibratory compacting and application of positive pressure using an inflatable bladder or application of negative pressure using a vacuum. The mold is thereafter opened and the resulting sand core 230 is released from the mold halves using gas flow. Specifically, the mold halves include air channels to permit compressed air to flow therethrough and push against the sand core 230 in order to rapidly release the sand core from the mold halves. The mold is then cleaned for reuse and the process starts again to form another sand core. The resulting sand core 230 may be finished by hand or machine to remove certain joint lines left behind by the joining of the mold halves and thereafter heat treated.

Referring back to FIG. 6, the fourth step 208 includes inserting the sand core 230 is a unitary piece within a decomposition mold (not shown). The decomposition mold includes an internal cavity that has the same dimensions as the decomposition conduit 100 to be fabricated, in addition to the interior of the decomposition conduit. In exemplary form, the sand core 230 is suspended within the decomposition mold and the decomposition mold is closed. The resulting cavity within the decomposition mold has the same dimensions as the decomposition conduit 100 to be fabricated. Thereafter, in the fifth step 210, molten metal is introduced into the interior of the decomposition mold and fills the gaps between the sand core and mold.

Figure 9:
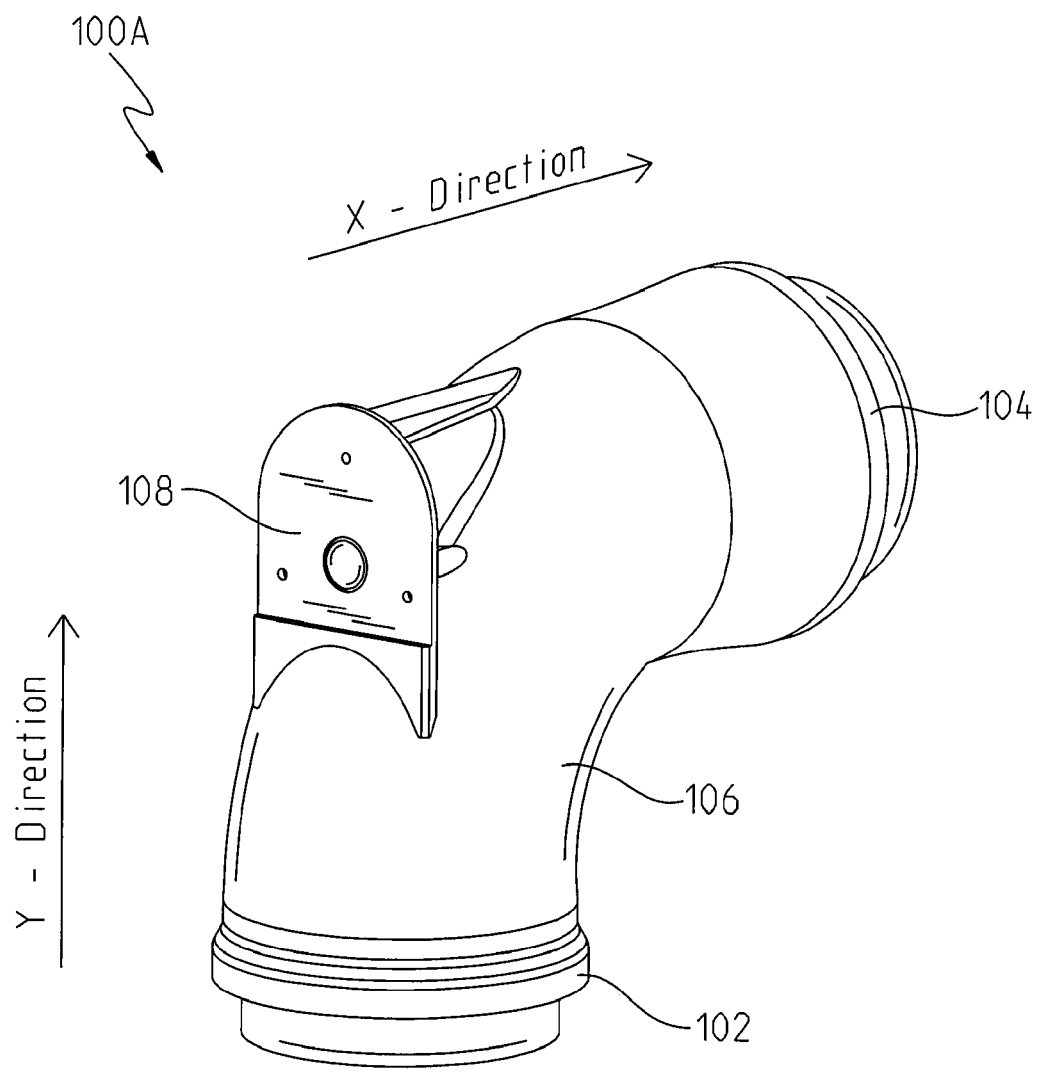
FIG. 9 is an elevated perspective view from the rear of a molded decomposition housing formed over the sand core of FIG. 8.
Figure 10:
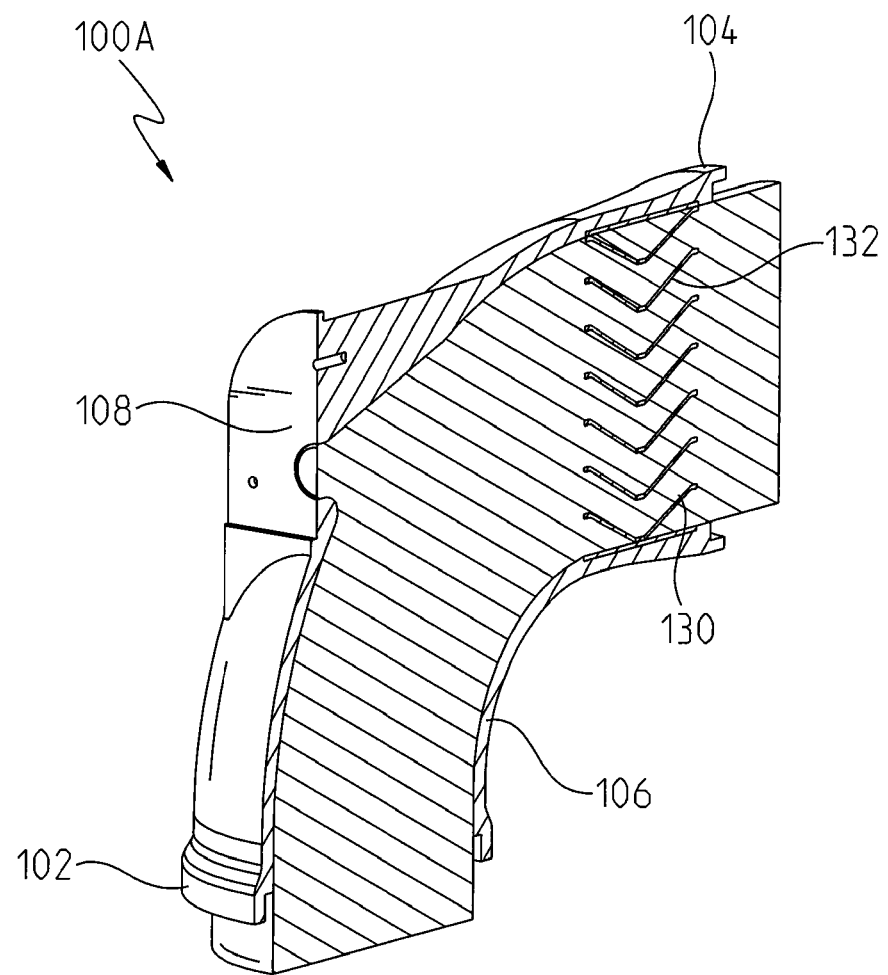
FIG. 10 is an elevated perspective view from the rear of a vertical cross-section showing the molded decomposition housing and sand core of FIG. 9.

Referring to FIGS. 9 and 10, the result of the fifth step 210 is a cast decomposition conduit housing 100A that is formed around the sand core 230. Specifically, the metal decomposition conduit housing 100A is integrally formed with the static mixer core 130 so that there is no seam or welded interface between the outer circumferential portion of the conduit and the circular rim of the static mixer core 130. As used herein, the term "integral" refers to a single structure that may be comprised of multiple structures without requiring welds or other fastening devices to mount the multiple structures to one another. As used herein, the term "integrally formed" refers to a process where multiple structures are produced to create is a single piece, where the multiple structures are mounted to one another without requiring welds or other fastening devices.

As will be appreciated by those skilled in the art, by integrating the static mixer core 130 into the outer wall of the decomposition conduit 100, the incidence of urea degradation causing the static mixer core 130 to separate from the decomposition conduit is substantially reduced if not eliminated.

After the decomposition conduit housing 100A has been formed in the fifth step 210, the decomposition conduit housing and sand core 230 are processed to remove the sand from the interior of the conduit 212. Exemplary methods of removing the sand include vibrating the sand free, using a fluid to flow through the interior of the decomposition conduit to remove the sand, and immersing the decomposition conduit in a fluid tank. The result of any one or more of these processes is the decomposition conduit shown in 24 FIGS. 2-4.

Figure 11:
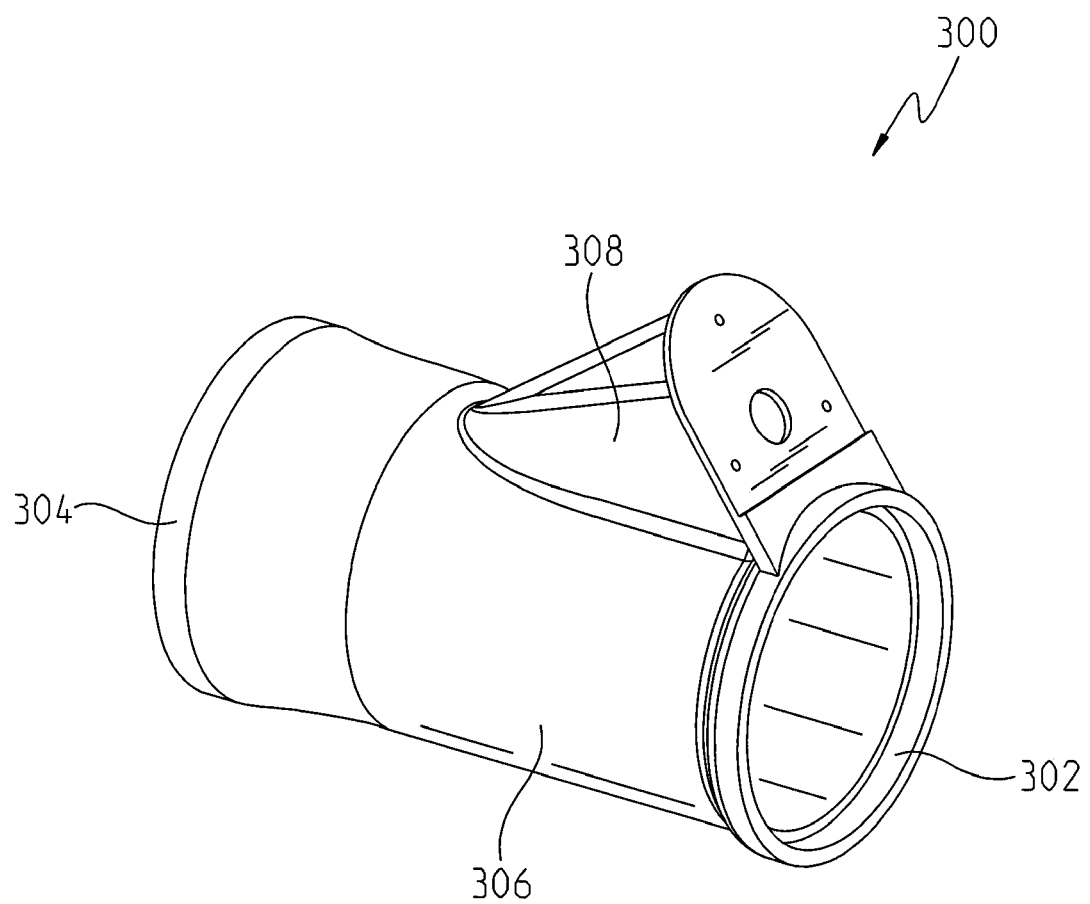
FIG. 11 is an elevated perspective view from the rear of a second exemplary decomposition conduit fabricated in accordance with the instant disclosure.
Figure 12:
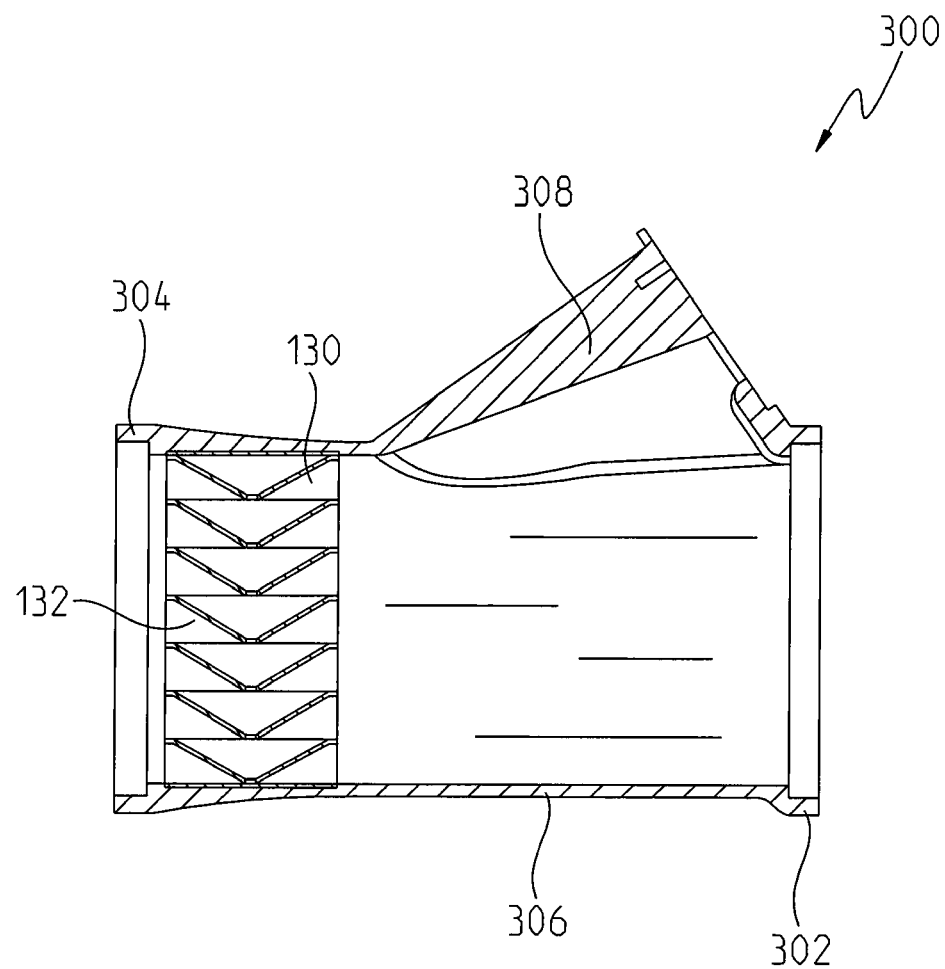
FIG. 12 is a vertical cross-sectional view of the exemplary decomposition conduit of FIG. 11.

Referring to FIGS. 11 and 12, a second exemplary decomposition conduit 300 includes an inlet bell 302 in communication with an outlet bell 304 interposing a straight conduit 306. The bells 302, 304 are integrally formed with the straight conduit 306 and provide a female interface to accept corresponding male pipes (not shown). Fluid flow is adapted to pass through the inlet bell 302 before egressing through the outlet bell 304. An injector fitting 308 is integrally formed with the conduit 306 in order to receive an injector 110 (see FIG. 5). As discussed previously, the injector 110 is connected to a DEF supply line 112 in communication with a DEF supply tank 114. In this manner, the DEF tank supplies DEF fluid to the injector 110, where DEF fluid is injected into communication with the exhaust.

Referring back to FIGS. 11 and 12, a static mixer 130 is provided as part of the decomposition conduit 300 downstream from the injector fitting 308 and just upstream from the outlet bell 304. Unlike prior art decomposition tubes, the static mixer 130 is formed as an integral unit with the straight conduit 306 and the injector fitting 308.

Referring to FIGS. 5, 12-15, the same or similar process flow 200 as described with respect to the first exemplary embodiment 100 may be used to fabricate the second exemplary decomposition conduit 300. However, instead of fabricating a curved sand core 230 as in the first exemplary embodiment, the second exemplary embodiment includes fabricating a relatively straight sand core 430 using a sand mold 320 having an interior cavity that is exactly the same size and includes the same dimensions as the interior of the decomposition conduit 300 to be fabricated.

Figure 13:
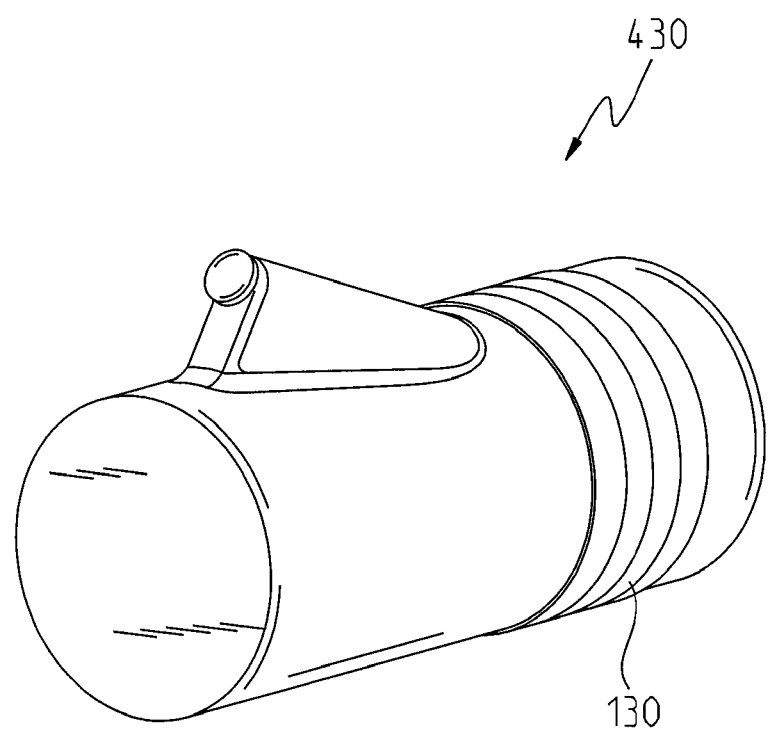
FIG. 13 is an elevated perspective view from the rear of an exemplary sand core utilized to fabricate the exemplary decomposition conduit of FIG. 11.
Figure 14:
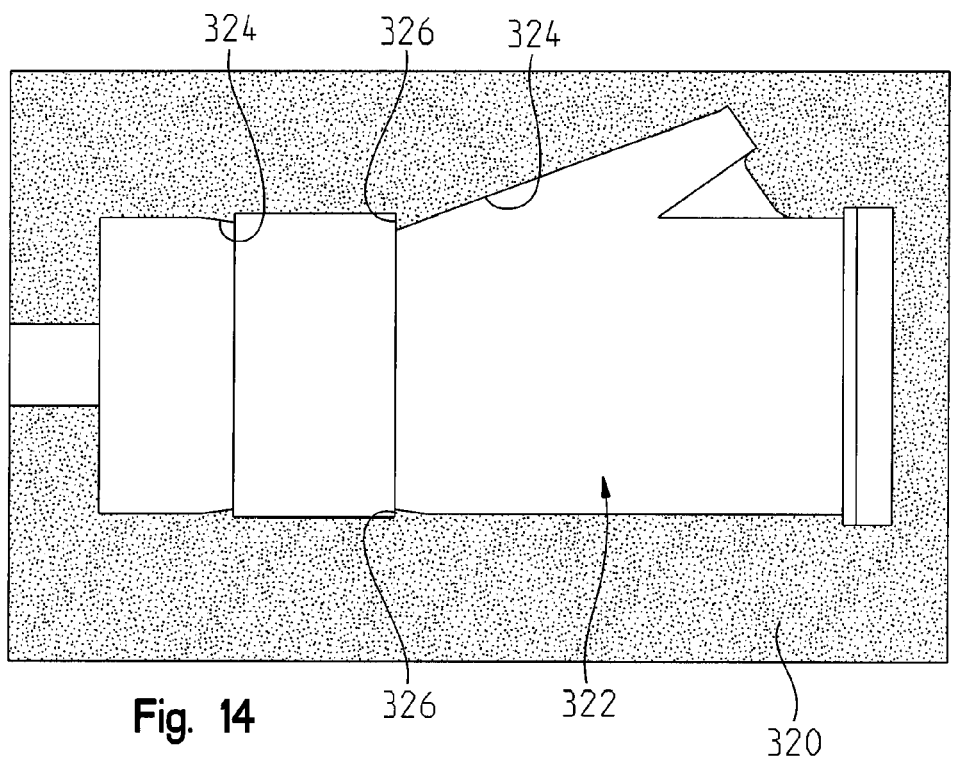
FIG. 14 is an overhead view of a right side mold half used to fabricate the sand core of FIG. 13.
Figure 15:
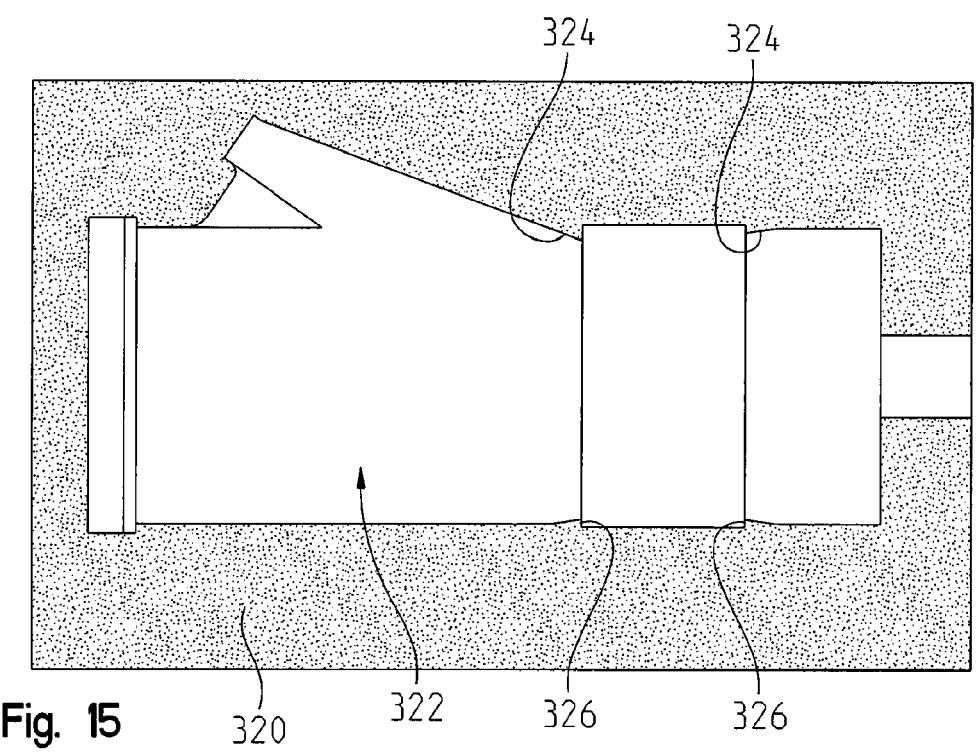
FIG. 15 is an overhead view of a left side mold half used to fabricate the sand core of FIG. 13.

Referring to FIGS. 13-15, a variety of techniques are employed to carry out the third step 206 of fabricating the sand core 430, depending on the nature of the mixture, the desired strength of the mold and the type of metal to be cast. In this exemplary embodiment, the sand mold 320 has an interior cavity 322 that is exactly the same size and includes the same dimensions as the interior of the decomposition conduit 300 to be fabricated. The sand mold 320 includes a wall 324 that tapers to include a pair of circumferential projections 326. These circumferential projections 326 operate as boundaries or bookends to help seat the static mixer 130 within the mold. It should be noted that the taper of the wall 324 is operative to reduce the cross-section of the sand core 430. As will be discussed hereafter, this reduction in the cross-section of the sand core 430 cooperates with the decomposition mold to create a decomposition conduit with a smooth transition between its interior wall and that of the static mixer 130. After the static mixer core 130 is positioned on the inside of the mold 320, the mold is closed and sand is introduced to fill all of the voids on the interior of the mold that are not otherwise occupied by the static mixer core, thus creating the sand core 430. The mold halves 320 are generally constructed of metal, but the mold halves may also be constructed of wood, gypsum or other material having sufficient hardness and strength.

The straight sand core 430 is thereafter inserted as a unitary piece within a decomposition mold (not shown). The decomposition mold includes an internal cavity that has the same dimensions as the decomposition conduit 300 to be fabricated, in addition to the interior of the decomposition conduit. In exemplary form, the sand core 430 is suspended within the decomposition mold and the decomposition mold is closed. The resulting cavity within the decomposition mold has the same dimensions as the decomposition conduit 300 to be fabricated. Thereafter, molten metal is introduced into the interior of the decomposition mold and fills the gaps between the sand core and mold.

Figure 16:
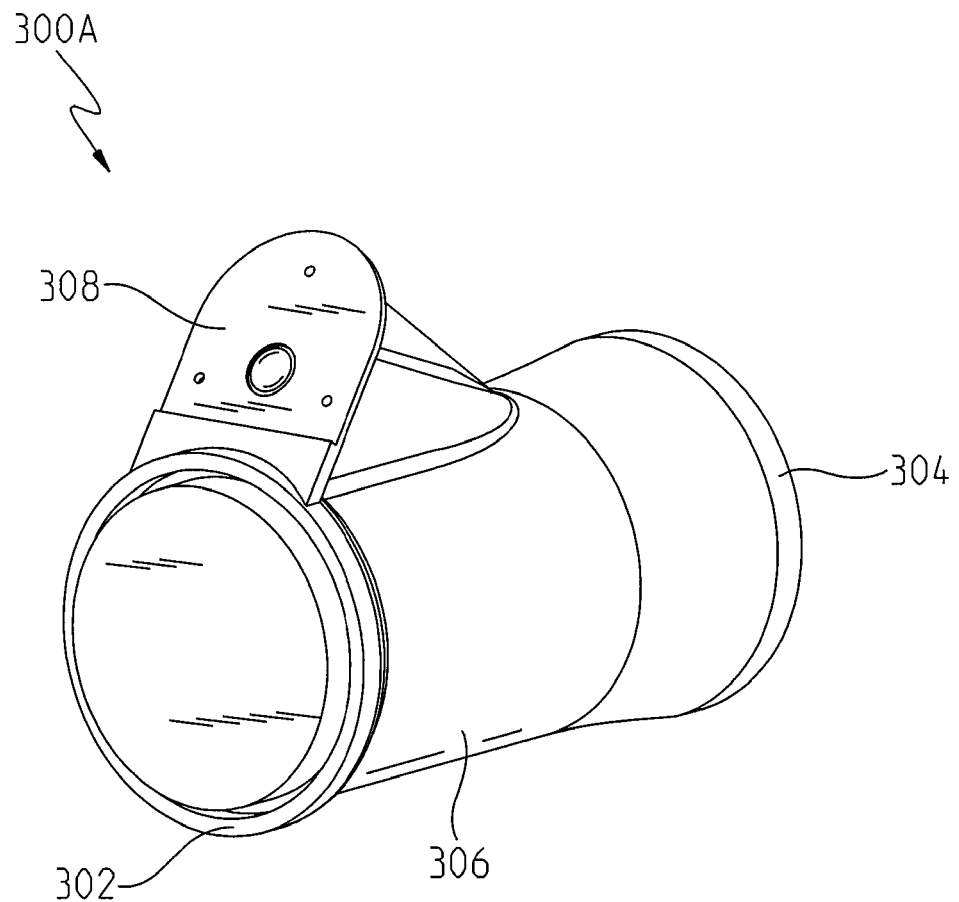
FIG. 16 is an elevated perspective view from the rear of a vertical cross-section showing the molded decomposition housing and sand core.
Figure 17:
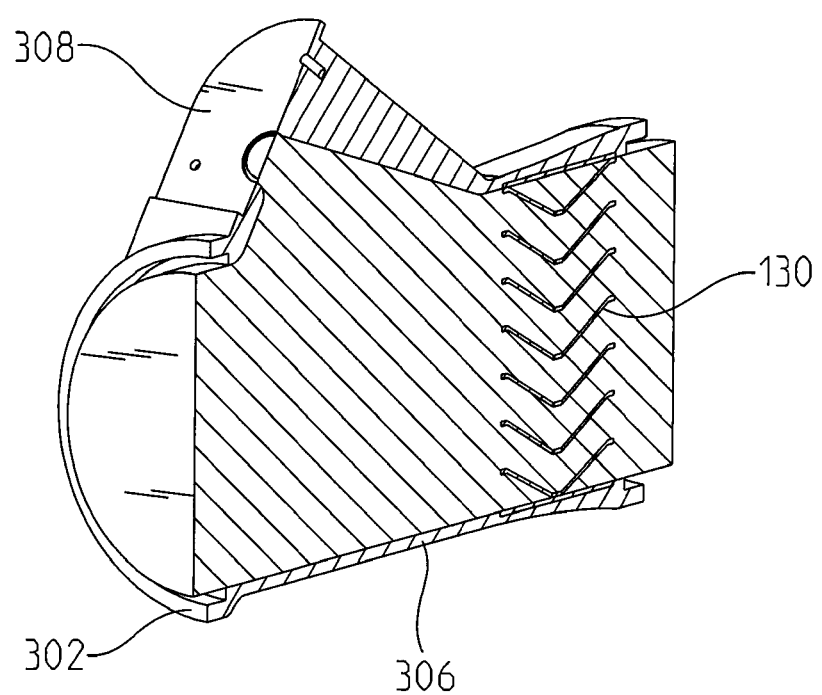
FIG. 17 is a vertical cross-sectional view of the exemplary decomposition conduit housing and sand core of FIG. 16.

Referring to FIGS. 16 and 17, the result of the casting step is a decomposition conduit housing 300A that is formed around the sand core 430. Specifically, the metal decomposition conduit housing 300A is integrally formed with the static mixer core 130 so that there is no seam or welded interface between the outer circumferential portion of the conduit and the circular rim of the static mixer core 430.

As will be appreciated by those skilled in the art, by integrating the static mixer core 130 into the outer wall of the decomposition conduit 300, the incidence of urea degradation causing the static mixer core 130 to separate from the decomposition conduit is substantially reduced if not eliminated.

After the decomposition conduit housing 300A has been formed, the decomposition conduit housing and sand core 430 are processed to remove the sand from the interior of the conduit. Exemplary methods of removing the sand include vibrating the sand free, using a fluid to flow through the interior of the decomposition conduit to remove the sand, and immersing the decomposition fluid in a fluid tank. The result of any one or more of these processes is the decomposition conduit 300 shown in FIGS. 10 and 11.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within, the scope of any claims, since the invention is defined by the claims and since inherent and/or unforeseen advantages of the present invention may exist even though they may not have been explicitly discussed herein.

What is claimed is:

1. A method of fabricating a decomposition conduit with an in-line static mixer, the method comprising:
   creating a sand core that includes the in-line static mixer;
   molding a decomposition conduit housing around the sand core by inserting molding material into a cavity between a decomposition conduit housing mold and the sand core; and,
   wherein the act of molding the decomposition conduit housing is operative to mount the in-line static mixer to the molded decomposition conduit housing.

2. The method of claim 1, wherein the sand core comprises a cylindrical sand body interposed by the static mixer, the cylindrical sand body including a projection representative of an injector adapter of the decomposition conduit housing.

3. The method of claim 1, wherein the act of molding the decomposition conduit housing includes suspending the sand core at least partially within the decomposition conduit housing mold.

4. The method of claim 1, wherein:
   the static mixer includes a plurality of mixer fins distributed within a metal band having an outer circumferential face; and,
   the act of molding the decomposition conduit housing includes overmolding material into contact with the outer circumferential face of the static mixer, where overmolding the material operates to bond the static mixer to the decomposition conduit housing.

5. The method of claim 1, further comprising the act of removing the molded decomposition conduit housing from the mold, where at least a portion of the sand core remains within the molded decomposition conduit housing when the decomposition conduit housing is removed from the mold.

6. A method of fabricating a decomposition conduit with an in-line static mixer, the method comprising:
   creating a sand core incorporating the in-line static mixer;
   inserting the sand core into a mold to create a decomposition conduit cavity and, molding a decomposition conduit housing around the sand core by inserting molding material into the decomposition conduit cavity;
   wherein the act of molding the decomposition conduit housing is operative to mount the in-line static mixer to the molded decomposition conduit housing.

7. The method of claim 6, wherein the act of creating the sand core includes forming a cylindrical sand body interposed by the static mixer, the cylindrical sand body including a projection representative of an injector fitting of the decomposition conduit housing.

8. The method of claim 6, wherein the act of creating the sand core includes positioning the static mixer within a sand core mold, wherein the static mixer and the sand core mold cooperate to delineate a sand core cavity.

9. The method of claim 8, wherein the sand core mold includes prongs formed by walls of the sand core mold tapering to seat the static mixer therein.

10. The method of claim 6, wherein:
    the static mixer includes a plurality of mixer fins distributed within a metal band having an outer circumferential face; and,
    the act of molding the decomposition conduit housing includes overmolding material into contact with the outer circumferential face of the static mixer, where overmolding the material operates to bond the static mixer to the decomposition conduit housing.

11. The method of claim 6, wherein:
    the sand core includes a bell; and,
    the act of molding the decomposition conduit housing includes integrally forming the bell.

12. The method of claim 6, wherein:
    the sand core includes a plurality of bells; and, the act of molding the decomposition conduit housing includes integrally forming the plurality of bells.

13. The method of claim 6, wherein the sand core includes a pair of circumferential depressions formed on opposite sides of the static mixer.

* * * * *